United States Patent Office 3,480,586
Patented Nov. 25, 1969

3,480,586
PROCESS FOR THE MANUFACTURE OF SHAPED ARTICLES, SUCH AS FIBERS, FILAMENTS AND FILMS, OF POLYESTERS
Paul-Friedrich Forster, Herbert Kurzke, Helmut Sattler, and Gunter Schnock, Bobingen, Germany, assignors to Farbwerke Hoechst Aktiengesellschaft vormals Meister Lucius & Bruning, Frankfurt am Main, Germany, a corporation of Germany
No Drawing. Filed Sept. 16, 1966, Ser. No. 579,856
Claims priority, application Germany, Sept. 16, 1965, F 47,205
Int. Cl. C08g 53/14, 53/16
U.S. Cl. 260—47
4 Claims

ABSTRACT OF THE DISCLOSURE

Production of shaped articles such as fibers, filaments and films of linear polyesters of high molecular weight by continuously melting a polyester having a water content within the range of 0.05 to 0.5% by weight and a specific viscosity $\eta$ spec. within the range of 0.4 to 0.9, maintaining the melt in a reaction space under a pressure within the range of 0.01 to 20 mm. of mercury for a residence time of 1 minute to 10 hours at a temperature within the range of 260° to 300° C., and then continuously shaping the melt by forcing it through nozzles.

---

The present invention relates to a process for the manufacture of shaped articles, for example, fibres, filaments and films, of polyesters.

In previously proposed processes for the manufacture of shaped articles of linear polyesters of high molecular weight, the monomer is polycondensed discontinuously in batches at a temperature above the melting temperature of the polyester. The finished melt is removed from the polycondensation vessel in the form of a band or strand, cooled and granulated. The granular product is transported, often in admixture with other charges, to the place of shaping where it is carefully dried, melted with the exclusion of atmospheric moisture and finally shaped by forcing it through nozzles. The shaped articles so obtained are subjected to a thermal-mechanical aftertreatment, if desired.

The large variety of process steps used renders the manufacture of shaped articles from polycondensates, particularly polyesters, time-consuming and very susceptible to trouble and considerably increases the manufacturing costs of the finished shaped articles.

It has also been proposed to produce the polycondensates continuously and to process directly the melt into the desired shaped articles. When proceeding in this manner, the steps of discharging, chilling, comminuting, drying and remelting are dispensed with. These processes, however, require expensive and complicated apparatus and an exact control of the course of the reaction in each of the apparatuses used for the individual stages in order to obtain end products of sufficiently uniform properties. With these complicated apparatus and several interconnected process steps, susceptibility to the cause of any, difficulty is not imediately obvious, since every disturbance in the complicated process affects the end product.

The reaction products obtained by the continuous process must, moreover, be recovered in complicated auxiliary apparatus by expensive purification processes which are only economic if large amounts of reaction products are manufactured. When proceeding in a continuous manner, it is therefore advantageous to perform the manufacture of the monomeric starting products, the continuous polycondensation and the processing of the high-polymeric mass into the desired shaped articles in one place. This requires the accumulation of a large number of apparatus, which may adversely affect the profitability.

It is generally known that even small amounts of moisture that are present during the melting of the polyester produce hydrolytic degradation whereby the molecular weight of the polyester is considerably reduced and its physical and chemical properties are changed. As a consequence thereof, no filaments or fibres or only those having inferior properties can be obtained from the polyester melt. In particular, the strength, bending strength and flex life of such shaped articles are unsatisfactory.

Hydrolytic degradation is also undesirable in the manufacture of other objects from the melt, for example, films or moulded articles. Objects obtained from highly dried, substantially anhydrous polyesters have a considerably higher toughness and are less brittle than those obtained from polyesters that have undergone hydrolytic degradation.

In a polyethylene terephthalate of a molecular weight of 19,000 (determined according to A. Conix, Makrom. Chem. 26 (1958), 226) which is within the usual range of application of this polyester, even a water content of 0.095% by weight may reduce the molecular weight by about 50% by hydrolysis. For these reasons, the moisture content present when melting the granular product should advantageously be less than 0.001 mol water for each recurring unit of polyester.

Prior to being shaped from the melt, the polyester is therefore generally dried in vacuo, in a current of nitrogen or air, by heating to elevated temperatures which must be below the melting point. The required high uniform degree of drying can be obtained only with great technical expenditure. The complete exclusion of moisture during transport of the dried granular product to the melting apparatus is also difficult.

Slight traces of water remain behind in the polyester even after most intensive drying and cause degradation and are therefore annoying particularly in the case of polyesters of high degree of polycondensation. In view of the hydrolytic degradation the said process is not applicable to the manufacture of shaped articles of polyesters having an extremely high molecular weight, as is desirable in industry.

We have now found that the disadvantages and difficulties caused by hydrolysis in the melting of polyesters can be avoided and shaped articles such as fibres, filaments and films of linear polyesters of high molecular weight can be obtained by continuously melting a polyester having a water content within the range of 0.05 to 0.5% by weight and a specific viscosity $\eta$ spec. within the range of 0.4 to 0.9, maintaining the melt in a reaction space under a pressure within the range of 0.01 to 20 mm. of mercury for a residence time of 1 minute to 10 hours at a temperature within the range of 260° to 300° C., and then continuously shaping the melt by forcing it through nozzles.

By heating the melt in vacuo, the polyester which has been partially degraded by the water on melting and therefore has a low solution viscosity, is again condensed. Owing to this so-called aftercondensation, the molten polyester, at the point at which it is shaped, has the high viscosity necessary for the manufacture of shaped articles, that is the required molecular weight, without having been previously dried.

The process of the invention is advantageously carried out at temperatures within the range of 270° to 285° C. under a pressure within the range of 0.1 to 5 mm. of mercury. The time for which the melt stays in the reaction space is preferably within the range of 10 minutes to 5 hours. For the reaction, any reaction vessel which permits continuous introduction and removal of the melt and adjustment of the required temperatures and pressures may be used. It is advantageous to use reaction vessels which are provided with stirring means by which the melt surface is continuously renewed. Apparatus suitable for carrying out the aftercondensation are, for example, vessels provided with stirrers, thin layer evaporators in a horizontal or upright position, reactors in horizontal or upright position with or without fixed installations or special stirrers, and single or multi-screw extruders which can be evacuated. The aftercondensation may also be carried out in several stages, if desired.

The water content of the granular polyester is measured by determining the difference in weight of a sample of about 10 g. before and after drying for 3 hours in vacuo at 180° C.

The process in accordance with the invention is especially applicable to all polyesters containing, as the acid component, predominantly terephthalic acid, as well as isophthalic acid, 4,4-diphenyl-dicarboxylic acid, hexahydroterephthalic acid, adipic acid, sebacic acid, naphthalene dicarboxylic acids, 2,5-dimethyl-terephthalic acid, 5-sulphoisophthalic acid and bis-p-carboxyphenoxyethane and as the alcohol component diols with 2 to 10 carbon atoms, for example, aliphatic diols, for example, ethylene glycol and butanediol, aromatic diols, for example, p-xylylene glycol, and cycloaliphatic diols, for example, cyclobutanediol and 1,4-dimethylolcyclohexane. Polyesters containing more than 75% terephthalic acid as the acid component or polyethylene terephthalate are preferably used.

The granular polyesters to be used in the process of the invention contain, from their manufacturing processes, for example, the ester-interchange and polycondensation catalysts described in J. Polymer Science, 54, page 388 (1961) in concentrations within the range of 0.001 to 0.1% by weight.

As described above, the granular polyester is not pre-dried to a water content of less than 0.05% by weight as in the known processes and hydrolytic degradation during melting is taken into account. By the aftercondensation in the series-connected reaction space which is kept under reduced pressure, the reduction of the molecular weight is reversed and the terminal carboxyl groups formed by hydrolysis are substantially esterified. It is even possible to obtain a higher molecular weight, if desired. The shaped articles made according to known methods by forcing the melt through nozzles have the same or even better properties than shaped articles obtained from dried polyester.

Depending on the reaction conditions, the degree of polycondensation, determined by the specific viscosity of the shaped articles, may be higher than the viscosity of the granular polyester. The degree of polycondensation of the end products depends on the degree of polycondensation of the polyester used, the average residence time of the melt in the reaction space, the fusion temperature, the vacuum applied and the speed with which the surface of the mass in the reaction space is renewed. The degree of polycondensation of the shaped articles can be precisely controlled by the reaction parameters even when the water content of the granular polyester varies.

The following examples illustrate the invention:

Example 1

Granular polyethylene terephthalate which had not been dried, and which had a water content of 0.08% by weight and a specific viscosity of 0.80 determined on a 1% solution of polycondensate in a mixture of 60 parts phenol and 40 parts tetrachlorethane at 25° C. in an Ubbelohde viscometer, was fused and introduced continuously into an aftercondensation reactor. The latter was 200 cm. long and 35 cm. in diameter and was provided with a cage impeller. The melt was removed at the end of the reactor and made into filaments in known manner. With a throughput of 100 kg./h., a pressure of 1.5 mm. of mercury and a temperature of 280° C., the specific viscosity of the shaped articles obtained was 0.80. The softening point was 262° C. After having been drawn at a ratio of 3.5:1 the filaments (TD 68/35) had a strength of 4 to 5 g./den. and an elongation at break of 18 to 22%, which corresponded to the corresponding values of filaments obtained from dried chips.

Example 2

Polyethylene terephthalate chips having a moisture content of 0.1% by weight of water and a viscosity $\eta$ spec. of 0.48 were continuously fused and aftercondensed as described in Example 1. The throughput was 31.8 kg./h. The reaction temperature was 280° C. and the pressure was 2.7 mm. of mercury. The filaments so obtained had a viscosity $\eta$ spec. of 0.83 and a carboxyl group content of 27 equivalents/$10^6$ g. The whiteness of the filaments was better and the content of carboxyl groups was lower than that of filaments obtained by conventional spinning processes. When dried chips (0.02% by weight of water) were used for the aftercondensation, the same final viscosity was obtained under the indicated conditions.

Example 3

Granular polyethylene terephthalate having a water content of 0.2% by weight was processed as described in Example 2. The pressure had to be adjusted to 2.0 mm. of mercury to obtain, under otherwise the same conditions as in Example 2, an end product of a viscosity $\eta$ spec. of 0.83. After melting, the viscosity $\eta$ spec. dropped from 0.48 to 0.30 and the content of carboxyl groups rose from 21 to 84 equivalents/$10^6$ g. The carboxyl group content of the end product was 29 equivalents/$10^6$ g.

Example 4

Granular polyethylene terephthalate which had not been dried and had a water content of 0.09% by weight and a viscosity $\eta$ spec. of 0.50 was fused and aftercondensed at 280° C. under a pressure of 0.7 mm. of mercury with a throughput of 15 kg./h. as described in Example 1 and the melt was made into filaments. The latter had a viscosity $\eta$ spec. of 1.16.

Example 5

Granular polyethylene terephthalate which had not been dried and had a water content of 0.18% by weight and a viscosity $\eta$ spec. of 0.50 was used. The melt was continuously aftercondensed at 275° C. under a pressure of 3.0 mm. of mercury as described in Example 1. With a throughput of 120 kg./h., an end product of a viscosity $\eta$ spec. of 0.51 was obtained.

We claim:
1. In the process for the manufacture of shaped articles, such as fibers, filaments and films, of linear polyesters of high molecular weight from the melt, the improvement comprising continuously melting a polyester of an acid selected from the group consisting of terephthalic acid, isophthalic acid, 4,4-diphenyldicarboxylic acid, hexahydroterephthalic acid, adipic acid, sebacic acid, naphthalene dicarboxylic acid, 2,5-dimethylterephthalic acid, 5-sulphoisophthalic acid and bis-p-carboxyphenoxyethane and a diol having 2 to 10 carbon atoms, said polyester containing from its manufacturing process ester-interchange and polycondensation catalysts in concentrations within the range of 0.001 to 0.1% by weight, said polyester having a water content within the range of 0.05 to 0.5% by weight and a specific viscosity $\eta$ spec. determined on a 1% solution of polyester in a mixture of 60 parts phenol and 40 parts tetrachlorethane at 25° C. in an Ubbelohde viscometer within the range of

0.4 and 0.9, maintaining the melt, prior to shaping, under a pressure within the range of 0.01 to 20 mm. of mercury, at a temperature within the range of 260 to 300° C. and for a period of one minute to 10 hours and shaping the melt whereby reduction in the molecular weight of said polyester is avoided and the specific viscosity of the shaped articles is the same or higher than the specific viscosity of the starting polyester.

2. The process for the manufacture of shaped articles according to claim 1 wherein the temperature is within the range of 270° to 285° C.

3. The process for the manufacture of shaped articles according to claim 1 wherein the pressure is within the range of 0.1 to 5 mm. of mercury.

4. The process for the manufacture of shaped articles according to claim 1 wherein the melt is maintained for a period of 10 minutes to 5 hours.

References Cited

UNITED STATES PATENTS 2,503,251  4/1950  Edwards et al. _____ 18—54

OTHER REFERENCES

Hardy, J.S.C.I., 67, 426–27 (1948).

Sorenson et al., Preparative Methods of Polymer Chemistry, N.Y., Interscience, 1961 (pp. 112–15).

Goodman et al., Polyesters, vol. I, N.Y., American Elsevier, 1965 (pp. 14–17).

HAROLD D. ANDERSON, Primary Examiner

LOUISE P. QUAST, Assistant Examiner

U.S. Cl. X.R.

260—75